US005132519A

United States Patent [19]

[11] Patent Number: 5,132,519

Jackson et al.

[45] Date of Patent: Jul. 21, 1992

[54] ELECTRIC HEATER

[75] Inventors: Brian C. Jackson, Whetstone; Benjamin G. Forty, Wigston, both of England

[73] Assignee: Techni Dry Limited

[21] Appl. No.: 679,196

[22] Filed: Apr. 2, 1991

[51] Int. Cl.[5] .......................... F27D 11/00; A21B 3/15

[52] U.S. Cl. .................................... 219/388; 219/402; 219/403

[58] Field of Search ............... 219/388, 401, 405, 402, 219/403; 392/416, 411, 417, 424, 408; 338/318, 319, 304

[56] References Cited

U.S. PATENT DOCUMENTS

| | | | |
|---|---|---|---|
| 1,405,506 | 2/1922 | Doyle | 219/480 |
| 3,355,574 | 11/1967 | Bassett | 219/464 |
| 3,622,750 | 11/1971 | Watts, Jr. | 219/342 |
| 3,946,353 | 3/1976 | Gallagher | 338/318 |
| 4,309,593 | 1/1982 | Jones et al. | 219/347 |
| 4,531,047 | 7/1985 | Canfield et al. | 219/354 |
| 4,551,616 | 11/1985 | Buttery | 219/460 |
| 4,580,035 | 4/1986 | Lüsher | 219/460 |

FOREIGN PATENT DOCUMENTS

| | | |
|---|---|---|
| 618353 | 2/1949 | United Kingdom . |
| 841913 | 7/1960 | United Kingdom . |
| 842911 | 7/1960 | United Kingdom . |
| 1125661 | 8/1968 | United Kingdom . |
| 1201607 | 8/1970 | United Kingdom . |
| 1276701 | 6/1972 | United Kingdom . |
| 1443340 | 7/1976 | United Kingdom . |
| 1483533 | 8/1977 | United Kingdom . |
| 1600091 | 10/1981 | United Kingdom . |
| 2086075 | 5/1982 | United Kingdom . |
| 2136549 | 9/1984 | United Kingdom . |
| 2154405 | 9/1985 | United Kingdom . |
| 8704739 | 8/1987 | World Int. Prop. O. . |

*Primary Examiner*—Bruce A. Reynolds
*Assistant Examiner*—Tuan Vinh To
*Attorney, Agent, or Firm*—Longacre & White

[57] ABSTRACT

The heater is primarily intended for infra-red drying of travelling sheet material such as printed or lacquered paper. Parallel elongate heating elements are contained in a housing having a front window and a rear openable cover carrying a ceramic reflector behind the heating elements, which reflector also serves to insulate the cover against heat from the elements. End portions of the elements are supported in rearwardly directed clips whereby elements removal and replacement can be readily effected at the rear of the housing. The clips are carried by opposed support bars which with adjacent side walls of the housing define cooling air ducts, the bars having openings for directing cooling air onto the end portions of the elements or to enable the latter to extend into the ducts for direct cooling. The front window is provided with air venting slots parallel with the heating elements and positioned opposite spaces between the latter. The elements and slots are inclined to the direction of travel of the sheet material.

11 Claims, 3 Drawing Sheets

ELECTRIC HEATER

BACKGROUND OF THE INVENTION

The present invention relates to an electric heater for use, for example, in heat treating travelling sheet material such as printed or lacquered paper.

An object of this invention is to provide an improved electric heater or heater unit primarily for infra red drying purposes e.g. in continuous process operations such as the ink drying of printed or lacquered paper or other material as well as for other drying or heating purposes. The heater may also be used to heat treat a travelling tile or web of polymeric material.

Such heaters are required to have a high heat output such that the whole unit can become extremely hot with the result that servicing of the unit such as heating element replacement can be is necessary.

Particular objects of the invention are to provide a heater capable of more efficient operation as regards heat output and drying action and also whereby the support structure or housing of the heater can be kept in a cooler condition to facilitate servicing and so reduce down time. These and other practical advantages will be apparent from the following disclosure.

SUMMARY OF THE INVENTION

According to this invention an electric heater primarily for heat treating travelling sheet material such as printed or lacquered paper comprises a housing having side walls, a front wall having a window opening therein and a rear openable cover, said cover having mounted thereupon or adjacent to it at least one panel of heat insulating and heat reflecting material such as ceramic material within the housing; a window of heat resistant and heat transmitting sheet material such as quartz glass carried by the housing across said window opening, and support means mounted within the housing for removably supporting end portions of elongate electric heating elements between said panel and said window whereby in use heat emitted by the heating elements is reflected forwardly by said panel and also radiated forwardly directly from the elements through said window onto, material to be heat treated, said panel also serving to insulate the rear openable cover from heat emitted by the heating elements in order to facilitate heating element removal rearwardly from the housing and replacement therein on opening said rear cover.

DESCRIPTION OF THE DRAWINGS

The invention will now be described by way of example with reference to the accompanying drawings which illustrate an infra red heater and in which.

Like parts are referred to by the same or similar reference numerals through out the drawings.

DETAILED DESCRIPTION

Figure 1:
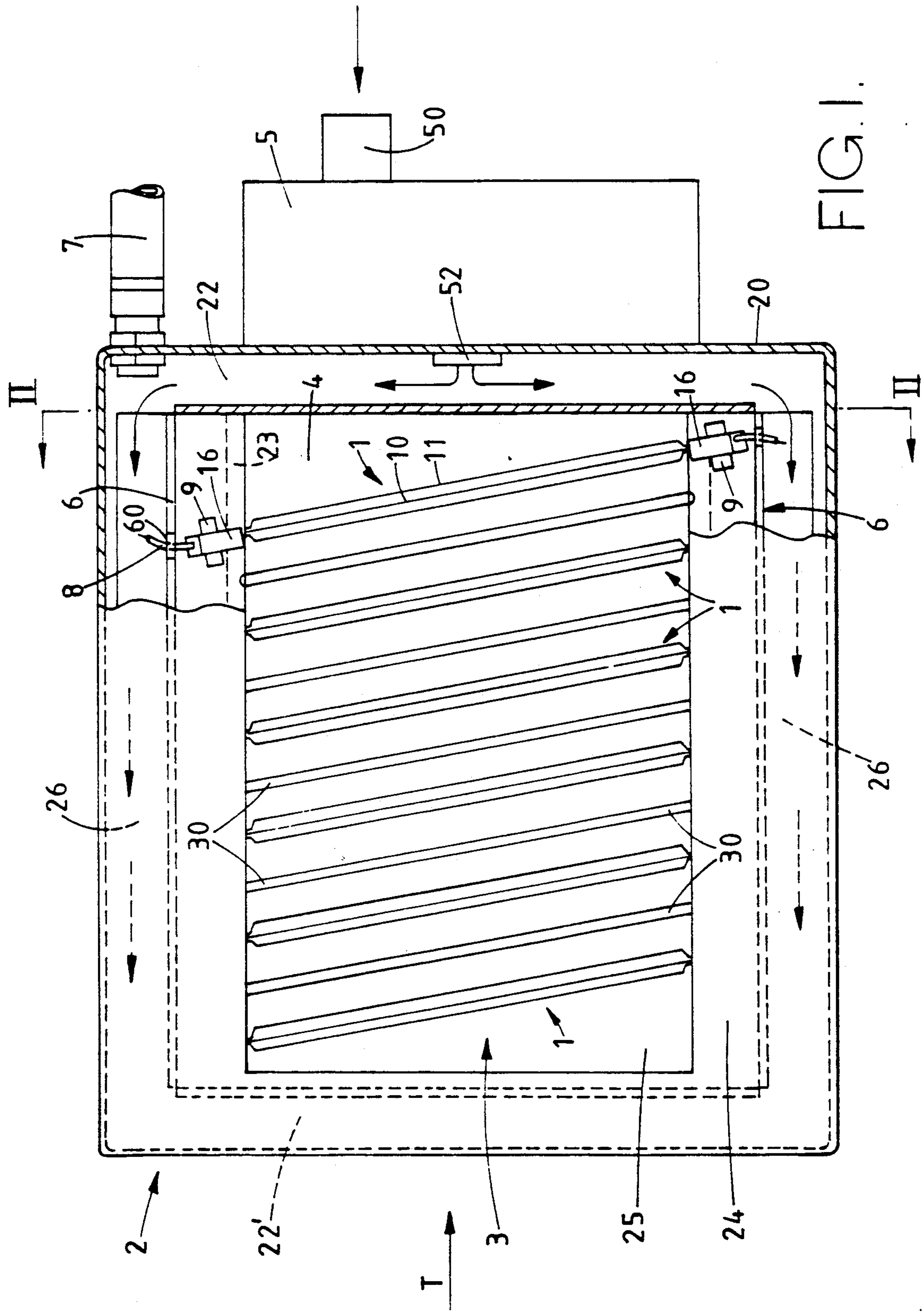
FIG. 1 is a face view of the unit, partly broken away to reveal interior construction.
Figure 2:
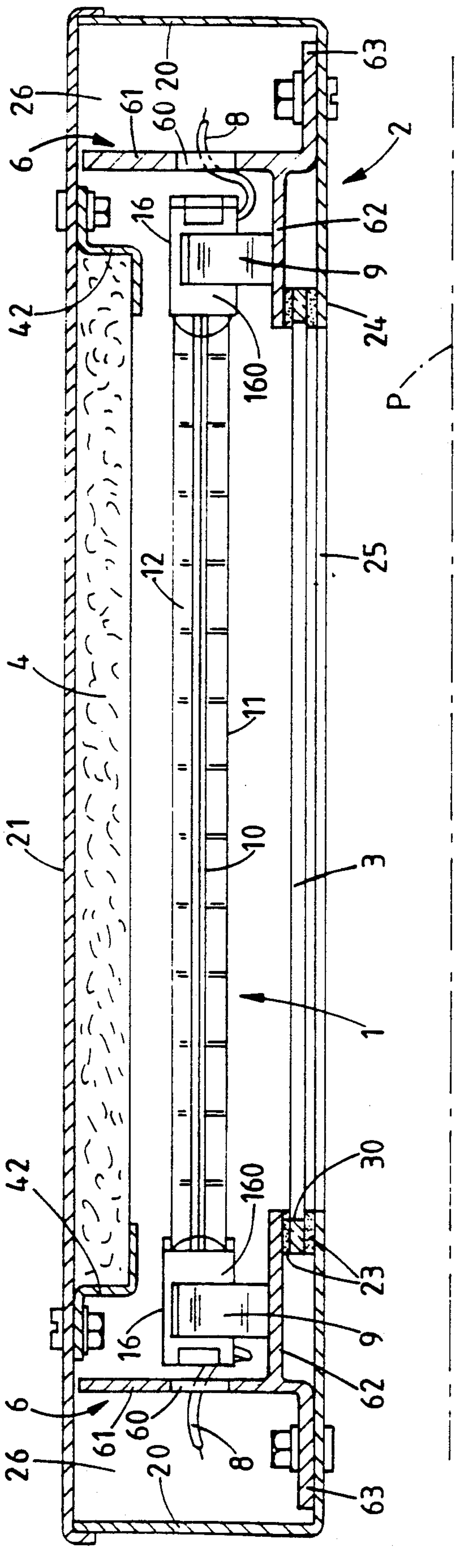
FIG. 2 is a cross section taken on the line II—II of FIG. 1 and on an enlarged scale.

Referring to FIGS. 1 and 2 the heater unit generally comprises an array of spaced apart parallel elongate infra red heating elements 1 mounted by their end portions in a support structure in the form of a housing 2 which latter consists of a rectangular frame providing side walls 20 and also a front wall 24 having an opening 25 provided with a window 3 of quartz glass or other suitable heat resistant and heat transmitting sheet material for the passage of radiant heat from the elements 1. The housing has an openable rear cover plate 21 which may be removably secured to it such as by screws (not shown) or hinge mounted on it. The term "openable" used herein includes a cover which is removable from the housing and/or hinged or similarly mounted on it.

Each heating element 1 is preferably of short wave infra red operation for high heat output efficiency and in which the heat emitting electric conductor 10 is contained co-axially within a silicon or other suitable tube 11 having a reflective rear coating 12 and provided with a mounting and electrical connection terminal head 16 at each end.

The window 3 serves to protect the elements 1 especially from dust and in use it faces the paper P or other material which is to be subject to drying heat from the elements 1. To provide more uniformly distributed heat application the heating elements 1 are shown inclined relative to the window opening 25 and direction of travel T of the paper or the like or the parallel arrangement of the elements may be in chevron formation.

A ceramic panel 4 is provided behind the heating elements 1 in relation to the window 3 and is shown conveniently carried by the cover plate 21 by angle section mounting strips 42. The ceramic panel 4 not only serves to reflect heat from the elements 1 towards the window 3 and thus augment the direct radiant heat emission in the operative direction for greater heat output, but also serves as a thermal barrier to insulate the cover plate 21 from rearward heat emission from the elements 1 and the general high temperature conditions within the housing 2 about the elements 1. As a result the cover plate 21 is kept in a cooler condition and so cools down sooner for removal when it is required to gain access to the elements 1 for replacement purposes or to otherwise service the interior of the housing 2.

It is found that in addition to effective heat reflection and insulation properties, the ceramic panel 4 is highly heat resistant and does not tend to deteriorate under conditions of use in providing a long serviceable life.

In order to counteract the high temperature conditions in the housing 2 provision is also shown included for the admission of cooling air flow into the housing 2, the air flow being introduced therein from a chamber provided by a box 5 mounted on the side of the housing 2, the box 5 having an air inlet connection at 50 and communicating at 52 with a side duct 22 of the housing 2. Air flow from the duct 22 passes along further ducting 26 provided between flanges 61 of opposed support bars 6 for the elements 1 and adjacent side walls 20 of the housing 2. Openings 60 in the flanges 61 admit the air flow to electrical conductor connection at 16 to the elements 1 whilst a communicating duct 22' at the opposite side of the housing also assists the air flow.

The ducting 26 also accommodates wiring (not shown) to the elements 1 and distribution junction blocks for electrically connecting the elements 1 in parallel, cable connection to the wiring being introduced into the housing 2 by flexible tubular conduit 7 e.g. from a plug and socket connection (not visible) which may be conveniently carried by the box 5.

As indicated in FIG. 2 the openings 60 in the flanges 61 enable wiring 8 to pass from the ducting 26 for connection to the element terminal heads 16. By maintaining the electrical connection to the elements 1 in a cooler condition, element removal and replacement is facilitated whilst deterioration due to heat of the insulation of the wiring is also minimised. It is also desirable that the terminal ends of the element tubes 12 are particularly subject to cooling air flow to minimise tube failure.

For readily removing and replacing each element, the head 16 at each end is received by a respective clip 9 mounted on a flange 62 of a corresponding support bar 6, the head 16 being shown in the form of a block of ceramic or other electrically insulating material having a metal outer sheathing 160 for ease of engagement with the clip 9 and disengagement therefrom. The open ends of the clips 9 are directed towards the rear cover plate 21 so that, on removal of the latter, the elements 1 can be readily withdrawn rearwardly from the clips 9 or replaced in them.

The flanges 62 also serve to hold the quartz window 3 in place on the front wall 24, heat resistant resilient packing strips 23 being interposed between the frame wall 25 and window 3 and also between the latter and the flanges 62. As will be seen in FIG. 2 each bar 6 is generally of L-form to provide the flanges 61 and 62 and also has a further flange 63 for securing it to the front wall 24.

In order to vent air flow from the housing 2, the window 3 is provided with openings shown in the form of slots 30 parallel with the elements 1 and positioned opposite spaces between the latter. The heated air flow vented in this way is thus directed in a correspondingly distributed manner onto the paper to assist the ink drying action whilst the outflow of air repels any dust tending to enter the housing 2 through the slots 30.

Figure 3:
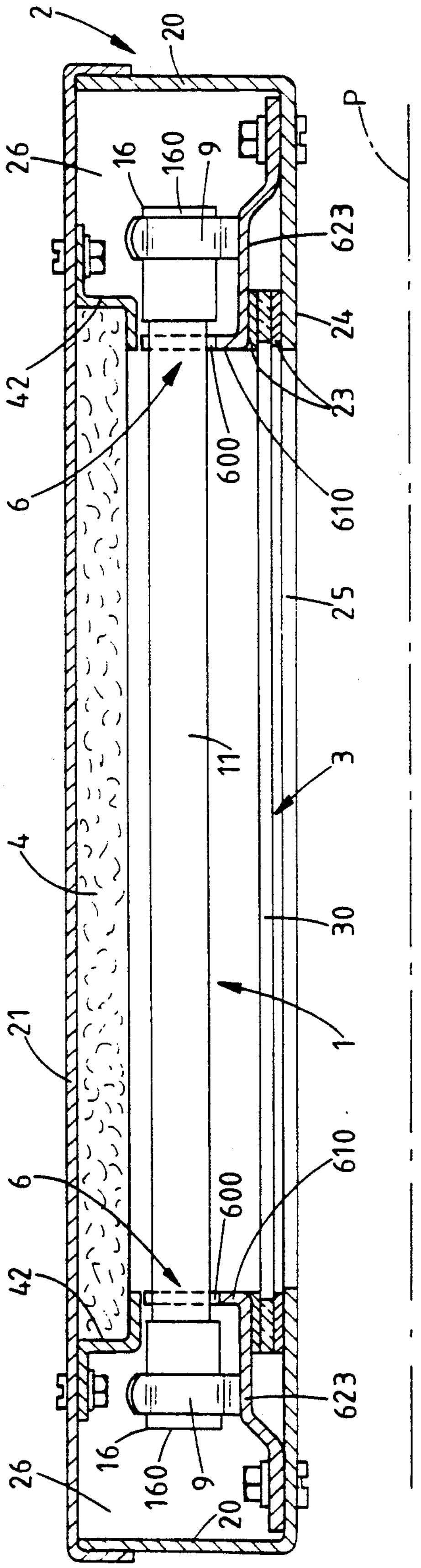
FIG. 3 is a cross section similar to FIG. 2 but showing an alternative arrangement of heater element mounting.

Referring to FIG. 3 the flange 610 of each support bar 6 is provided with openings in the form of gaps 600 through which end portions of a corresponding heating element tube 12 pass whereby the terminal heads 16 and clip mountings 9 are situated in respective cooling air ducts 26 so as to directly and fully receive cooling air flow therein. For this purpose each flange 623 carrying the clips 9 is outwardly directed and as well as retaining the window 3 against the front wall 24 is also cranked against said wall and secured to it.

Figure 4:
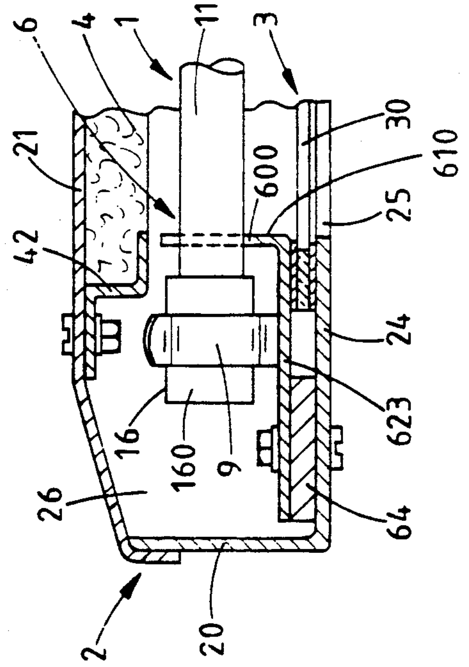
FIG. 4 is a detail cross sectional view of a modification of the arrangement shown in FIG. 3.

A modification of the above described arrangement is shown in FIG. 4 in which the flange 623 is straight and spaced from the front wall 24 by a spacing bar 64 or other suitable spacing means.

In all the arrangements of the heater herein described the heating element 1 is closely situated to both the ceramic reflector panel 4 and also to the protective window 3 for efficient heat output as well as providing a compact arrangement having a minimum front to rear overall dimension. This is advantageous where limited space is available for installing the heater in position of use e.g. in a printing machine or associated paper output mechanism.

Further in this regard the manner in which access can be gained into the housing 2 at the rear of the latter enables element replacement and/or other servicing to be readily carried out with reduced cooling down time and usually while the heater unit is in position of use in a printing machine or similar situation. Furthermore there is no need to dismantle the heater unit for such servicing.

Practical tests have established that an improved drying action is obtained with the above described heater and with a considerably reduced drying time e.g. of the order of 15 to 20 minutes. The reduced drying time also minimises the likelihood of fire breaking out in the paper or other flammable material at P. In fact in the drying of ink or lacquer printed on paper the infra-red emission of the elements 1 can be such as to effect, rapid drying without adversely affecting the paper, Whereas in the described embodiment a cooling air flow is introduced into the housing, it will be appreciated that a gaseous cooling medium consisting of a gas or gas mixture can be used. More particularly, it has been found that the use of an inert gas, normally nitrogen, is especially advantageous. Whereas in the described embodiments of the invention the ceramic reflector 4 is secured to the removable cover plate 21, it is to be understood that the reflector 4 could be mounted adjacent to the cover plate 21 such as from side walls 20 of the housing 2 such as by suitable brackets.

We claim:

1. An electric heater primarily for heat treating traveling sheet material especially printed or lacquered paper by infra red radiation comprising:

a) a housing having side walls and a front wall having a window opening therein;

b) a rear openable cover to the interior of the housing and provided at the back of said housing;

c) at least one panel of heat insulating and heat reflecting material mounted on said rear openable cover so as to be disposed within the housing when the cover is closed thereon and withdrawn from the housing with the cover when said cover is opened;

d) a window of heat resistant and heat transmitting sheet material carried by the front wall of the housing across the said window opening;

e) a plurality of spaced apart substantially parallel elongated electric heating elements mounted by their end portions within the housing closely between the heat insulating and heat reflecting panel and said window of heat resistant and heat transmitting sheet material whereby in use heat emitted by the heating elements is reflected forwardly by said panel and also radiated forwardly directly from the heating elements through said window onto material to be heat treated, said panel also serving to insulate the rear openable cover from heat emitted by the heating elements in order to facilitate opening of said cover for heating element removal and replacement; and f) mounting means in the housing for said electric heating elements comprising clips mounted within the housing so as to extend in a direction away from the back of the front wall of the housing, which chips receive corresponding end portions of the heating elements, and receiving ends of said clips being directed towards the rear openable cover and panel for heating element removal and replacement rearwardly from the housing on opening of said cover and withdrawal of the panel therewith.

2. An electric heater according to claim 1 wherein the clips are mounted from the back of the front wall of the housing so as to extend rearwardly therefrom.

3. An electric heater according to claim 1 wherein the mounting of the electric heating elements in the housing in spaced apart substantially parallel formation is such that the elements are inclined to the direction of travelling movement of sheet material to be heat treated relative to the heater for more uniformly distributed heat treatment of the sheet material by the heating elements.

4. An electric heater according to claim 1 wherein the window of heat resistant and heat transmitting sheet material is slotted for distributed venting of gaseous cooling medium from the housing onto the travelling sheet material, the slots being substantially parallel with the heating elements, each slot being positioned opposite a space between substantially parallel adjacent heating elements.

5. An electric heater primarily for heating treating travelling sheet material especially printed or lacquered paper by infra red radiation comprising:

a) a housing having side walls and a front wall having a rectangular window opening therein;

b) a rear openable cover to the interior of the housing provided at the back of said housing;

c) at least one panel of heat insulating and heat reflecting material mounted on said rear openable cover so as to be disposed within the housing when the cover is closed thereon and withdrawn from the housing with the cover when said cover is opened;

d) a window of heat resistant and heat transmitting sheet material carried by the front wall of the housing across the said window opening;

e) a plurality of spaced apart substantially parallel elongated electric heating elements mounted by their end portions within the housing closely between the heat insulating and heat reflecting panel and said window of heat resistant and heat transmitting sheet material whereby in use heat emitted by the heating elements is reflected forwardly by said panel and also radiated forwardly directly from the heating elements from said panel and also radiated forwardly directly from the heating elements through said window onto material to be heat treated, said panel also serving to insulate the rear openable cover from heat emitted by the heating elements in order to facilitate opening of said cover for heating element removal and replacement;

f) mounting means in the housing for said electric heating elements comprising a pair of opposed parallel support bars mounted in the housing alongside respective opposite side edges of the window opening in the front wall of said housing, said bars carrying clips which receive corresponding end portions of the electric heating elements, which clips have their receiving ends directed towards the rear openable cover and panel for heating element removal and replacement rearwardly from the housing on opening of said cover and withdrawal of the panel therewith, each of said support bars having a flange provided with openings therethrough at respective mounted end portions of the heating elements, and disposed alongside and spaced from an adjacent side wall of the housing to define a duct therebetween for the flow of a cooling gaseous medium, the openings in said flange especially enabling respective mounted end portions of the heating elements to be subject to the cooling action of a said flow of cooling gaseous medium;

g) inlet means to said housing for the admission of a said flow of cooling gaseous medium to each duct, and h) outlet means to said housing for venting the cooling gaseous medium from that interior part of the housing containing the heating elements after the cooling gaseous medium has passed to said interior part through the openings in the flange of each support bar.

6. An electric heater according to claim 5 wherein the support bars are mounted on the back of the front wall of the housing within said housing.

7. An electric heater according to claim 5 wherein the opening in the flange of each support bar admits flow of côoling gaseous medium therethrough from the adjacent duct to the heating elements especially in the vicinity of their respective moutned end portions.

8. An electric heater according to claim 5 wherein the openings in the flange of each support bar receive respective mounted end portions of the heating elements extending therethrough into the adjacent duct for direct cooling by a said flow of cooling gaseous medium along said duct.

9. An electric heater according to claim 5 wherein each support bar includes a further flange to retain the window of heat resistant and heat transmitting sheet material in position across the window opening in the front wall of the housing.

10. An electric heater according to claim 9 wherein said further flange of each support bar carries the clips which receive corresponding end portions of the electric heating elements.

11. An electric heater according to claim 9 wherein each support bar is of generally L-form in cross-section to provide said duct defining flange having said openings therethrough and to provide said further flange for retaining the window of heat resistant and heat transmitting sheet material in position across the window opening in the front wall of the housing.

* * * * *